Aug. 17, 1948.   L. W. VOGEL   2,447,105
CONTAINER FOR FISHHOOKS
Filed Sept. 4, 1943
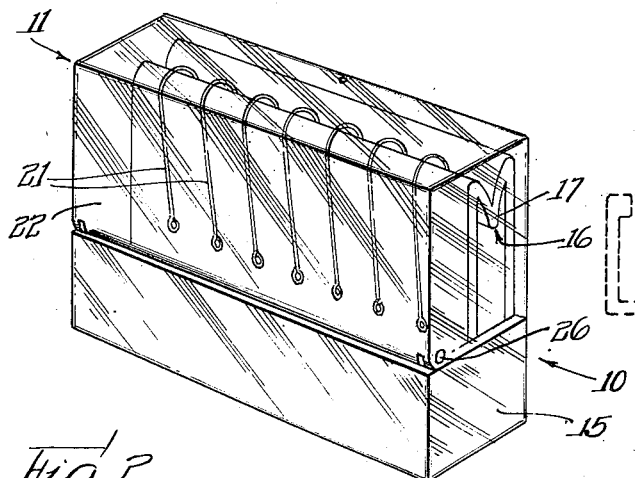
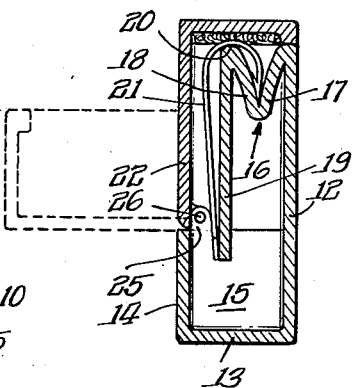
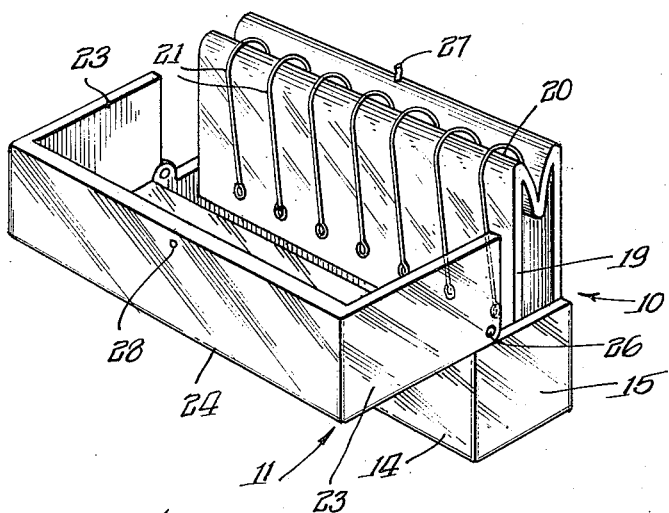
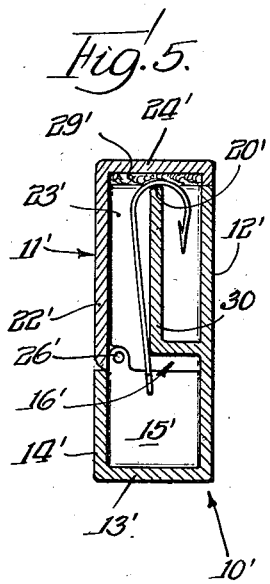
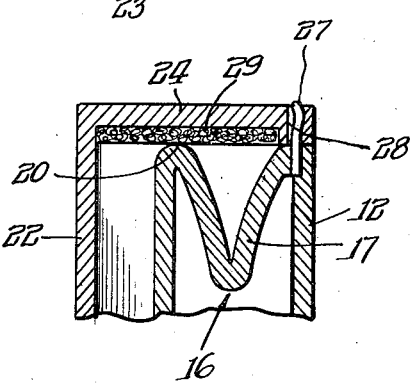
INVENTOR.
Louis W. Vogel
BY
his Atty.

Patented Aug. 17, 1948

2,447,105

UNITED STATES PATENT OFFICE 2,447,105

CONTAINER FOR FISHHOOKS

Louis W. Vogel, Chicago, Ill.

Application September 4, 1943, Serial No. 501,252

8 Claims. (Cl. 43—32)

The invention relates generally to containers and more particularly to a container for holding and carrying fish hooks or similar objects.

A general object of the invention is to provide a fish hook container of new and improved construction, resulting in a compact, safe and economically manufactured container.

A more particular object is to provide a container having a support upon which the hooks are suspended by their hook portion without interlocking engagement with the support, and a closure for the container which, when in open position, uncovers all of the hooks for ready removal by simple lifting of a selected hook and, when in closed position yieldably engages the hooks to hold them in position on the support.

Another object is to provide a container having but a single movable closure, the remainder of the container being integral and formed from a sheet of material.

Other objects and advantages will become apparent from the following detailed description taken in connection with the accompanying drawings, in which:

Fig. 1 is a perspective view of a container embodying the features of my invention.

Fig. 2 is a view similar to Fig. 1 but showing the closure in open position.

Fig. 3 is a transverse sectional view of the container shown in Fig. 1.

Fig. 4 is a fragmentary and enlarged transverse sectional view to show certain details of construction.

Fig. 5 is a transverse sectional view showing a modified form of container.

While the invention is susceptible of various modifications and alternative constructions, there is herein disclosed and will hereinafter be described a preferred embodiment and one modification. It is not intended, however, that the invention is to be limited thereby to the specific forms disclosed. On the contrary, it is intended to cover all modifications and alternative constructions falling within the spirit and scope of this invention as defined in the appended claims.

Referring to the embodiment of the invention disclosed in Figs. 1 to 4, the container comprises a main casing portion, generally designated 10, and a closure therefor, generally designated 11, the two portions making up a completely closed container when the closure is in closed position. The main casing portion in turn comprises a rear wall 12, a bottom end wall 13, a partial front wall 14, and partial side walls 15, the front and side walls extending upwardly from the bottom end wall a distance less than the total height of the container and thereby forming an opening at the end of the main casing portion opposite the bottom end wall 13. Preferably and conveniently, this main casing portion is formed from a single sheet of plastic material. The rear wall, the bottom end wall, and the front wall 14 are readily formed by mere bending of a sheet of plastic material. The partial side walls 15 are also readily formed from the same sheet of material, these walls being left as ear-like projections when the sheet of material is initially cut and then folded at right angles to the rear wall 12 and integrally bonded along the bottom edge to the bottom end wall 13, and at the front edge to the front wall 14 in some conventional manner, as by the application of a solvent in sufficient quantity temporarily to soften the parts to be bonded.

Carried by this main casing portion is a supporting member 16 upon which the fish hooks are mounted. It is a feature of this invention that the fish hook supporting member 16 is of such character and location in relation to the closure 11 that when the closure is open the fish hooks on the supporting member are completely exposed and may be removed from the container by a simple lifting operation, while the fish hook supporting member cooperates with the closure when in closed position to hold the hooks thereon against loss off of the member, and even against shifting on the member. Herein the supporting member 16 is preferably and conveniently formed as an integral part of the main casing portion from the same sheet of plastic employed to form the heretofore described walls. To that end, an extension of the top of the rear wall 12 is first bent downwardly and forwardly, and thence upwardly and forwardly, and thence again vertically downwardly, as best seen in Fig. 3. Thus the supporting member 16 is composed of three parts 17, 18 and 19, with the parts 17 and 18 forming an upwardly opening trough and the juncture between the parts 18 and 19 forming a hook carrying edge 20 extending parallel with and spaced forwardly of the rear wall 12. This edge 20, as best seen in Fig. 3, is at substantially the level of the top edge of the rear wall 12. The parts 17 and 18 of the supporting member are made of such proportion that the trough therebetween will accommodate the barbed end of a hook 21, of the largest size intended to be carried in the container, when the hook rests on the edge 20. The vertical part 19 extends downwardly preferably to a point below the eye of any hook 21 that may be mounted on the edge 20 in the above described manner.

The closure 11 comprises a main portion 22, side flanges 23, and a top flange 24 serving to complete the front and side walls of the container and form the top end wall, respectively, when the closure is in closed position. It is believed apparent that the closure, like the main casing portion, may be formed as an integral structure from a single sheet of plastic material. The closure is pivoted to the main casing portion of the container at the top of the partial front wall 14. To that end each partial side wall 15 is provided with an upstanding ear 25 immediately adjacent the partial front wall 14. The closure is pivotally secured to the ears 25 through the medium of pins 26 projecting through the side flanges 23 and into the adjacent ears 25. These pins 26 may also be of plastic material obviating the employment of any metal whatsoever. The lower edge of the main portion 22 of the closure is beveled and appropriately cut away to permit opening of the closure without interference by the ears 25. The container is preferably provided with some means for latching the closure in closed position and herein such latch means takes the form of a peg 27 extending upwardly from the top edge of the rear wall 12. Cooperating with the peg is a hole 28 in the rear edge of the top flange 24 of the closure, into which the peg 27 projects when the closure is swung to closed position. Preferably the peg is given a slight rearward bend or bulge and the hole 28 is given a slight forward bulge so as to result in a slight snap holding action.

As previously stated, the closure cooperates with the fish hook supporting member to hold hooks on the member when the closure is in closed position. To facilitate this without injury to the hooks or without strain or injury to the container, the inner surface of the top flange 24 has secured thereto a pad or covering 29 of some yieldable, resilient material, such as felt, sponge rubber, or the like. This pad or covering 29 lightly engages the edge 20 of the supporting member 16 when the closure is in closed position and thus yieldingly grips any and all hooks that may be on the supporting member to prevent their loss off of the supporting member, and even to prevent their shifting longitudinally of the supporting member.

In the modified form of the invention illustrated in Fig. 5, the container still comprises a main casing portion 10' and a closure 11'. The main casing portion has a rear wall 12', a bottom end wall 13', a partial front wall 14', and partial side walls 15', the same as the container of Figs. 1 to 4, except that the structure is cast rather than being formed from a sheet of plastic material. The closure, likewise, is composed of a main portion 22' and side and top flanges 23' and 24', respectively, with the top flange again carrying a pad or covering 29' of some resilient material. The closure may be either cast or formed from a sheet of plastic material and is hingedly connected to the main casing portion in the manner described with the form of the invention shown in Figs. 1 to 4.

The hook supporting member 16' in this form of the invention is in the nature of a bracket 30 which is cast integrally with the rear wall 12' and extends forwardly and then upwardly to terminate in a hook carrying edge 20' extending parallel with and spaced forwardly of the rear wall 12'. The edge 20' again is substantially at the level of the top edge of the rear wall 12' so as to cooperate with the pad 29' and the top flange 24' in holding fish hooks against loss off of or displacement along the bracket 30.

It is believed apparent from the foregoing that I have perfected a fish hook container which gives unusually full and complete access to the hooks when the container is open. At the same time, the hooks are firmly and securely held against loss and against shifting when the container is closed. This is all accomplished without any interlocking engagement of the hooks, and, particularly, the barbed ends thereof with some part of the container, thus permitting ready and convenient removal of the hooks by a simple picking-off operation. Further, the container is of simple construction, containing a minimum of parts that may get out of order, is economically manufactured, and is sturdy and compact. The plastic employed may be transparent, as here shown, to permit the fisherman to determine, at a glance and without opening the container, whether he has the desired kind and number of hooks.

I claim as my invention:

1. A container for fish hooks or the like comprising a main body portion having a rear wall, a bottom end wall and a front wall and side walls extending upwardly from the bottom wall only a part of the distance, a fish hook supporting member carried by the rear wall and extending parallel therewith and spaced forwardly therefrom, the upper edge of the supporting member being substantially at the level of the top of the of the rear wall, and a closure pivotally mounted on said main body portion comprising a main portion forming the balance of the front wall of the container, side flanges and a top flange projecting laterally of said main portion to complete the side walls and form the top end wall respectively of the container when the closure is in closed position, and a pad of resilient material on the inner side of said top flange for yieldably engaging and holding fish hooks on said supporting member in position.

2. A container for fish hooks or the like comprising a rear wall, a bottom end wall, side walls, and a front wall extending upwardly from the bottom wall over only a portion of the height of the container, a fish hook supporting member extending parallel with the rear wall and spaced forwardly therefrom providing an edge on which fish hooks are carried by placing the hook portion thereover, the hook carrying edge of the supporting member being substantially at the level of the top of the rear wall, and a closure pivotally mounted on the container and comprising a main portion forming the balance of the front wall of the container and a laterally projecting flange forming the top end wall of the container when the closure is in closed position, and a pad of resilient material on the inner side of said flange for yieldably engaging and holding in position fish hooks on said supporting member.

3. A container for fish hooks or the like comprising a main body portion including a rear wall, a fish hook supporting member rigid with said main body portion and extending parallel with and spaced forwardly from the rear wall and providing an edge upon which fish hooks may be carried by engagement of the hook portion thereover, the hook carrying edge of the supporting member being substantially at the level of the top of the rear wall, and a closure pivotally mounted on said main body portion and operating when in closed position to retain hooks yieldably on said supporting member.

4. A container for fish hooks or the like comprising a rear wall, a bottom end wall, side walls, and a partial front wall extending upwardly from the bottom wall over only a portion of the height of the container, an extension of the top of said rear wall bent first downwardly and forwardly and then upwardly and forwardly to provide a fish hook carrying edge extending parallel with the rear wall and spaced forwardly therefrom on which fish hooks are supported by placing the hook portion thereover with the barbed end in the trough formed by the reverse bend of the extension, the hook carrying edge being substantially at the level of the top of the rear wall, and a closure pivotally mounted at the top of the partial front wall and comprising a main portion forming the balance of the front wall of the container and a laterally projecting flange forming the top end wall of the container when the closure is in closed position, and a pad of resilient material on the inner side of said flange for yieldably engaging and holding in position fish hooks on said carrying edge.

5. A container for fish hooks or the like comprising a rear wall, a bottom end wall, side walls, and a partial front wall extending upwardly from the bottom wall over only a portion of the height of the container, an extension of the top of said rear wall bent downwardly and forwardly then upwardly and forwardly and then substantially vertically downwardly to provide a hook carrying edge extending parallel with the rear wall and spaced forwardly thereof upon which hooks may be mounted by placing the hook portion over the edge with the barbed point in the trough formed by the first mentioned bends and with the eye-end extending downwardly and resting against the vertical portion of the extension, the hook carrying edge being substantially at the level of the top of the rear wall, and a closure pivotally mounted at the top of the partial front wall and comprising a main portion forming the balance of the front wall of the container and a laterally projecting flange forming the top end wall of the container when the closure is in closed position, and a pad of resilient material on the inner side of said flange for yieldably engaging and holding in position fish hooks on said carrying edge.

6. A container for fish hooks or the like comprising a main casing portion having a rear wall, a bottom end wall, a partial front wall, and partial side walls extending upwardly from the bottom wall over only a part of the distance all formed from a single sheet of plastic bent and integrally bonded at the intersections to form a unitary main casing portion, an integral extension of the top of said rear wall bent to provide a fish hook carrying edge extending parallel with and spaced forwardly of the rear wall, the edge being substantially at the level of the top of the rear wall, and a closure pivotally mounted on said main casing portion comprising a main portion forming the balance of the front wall of the container, side flanges and a top flange projecting laterally of said main portion to complete the side walls and form the top end wall, respectively, of the container when the closure is in closed position, said closure being formed from a single sheet of plastic, and a pad of resilient material on the inner side of said top flange yieldably engaging said hook carrying edge to hold in position the fish hooks on said carrying edge.

7. A container for fish hooks or the like comprising a rear wall, a bottom end wall, side walls, and a partial front wall extending upwardly from the bottom wall over only a portion of the height of the container, a bracket member rigid with said rear wall and extending forwardly and upwardly to terminate substantially at the level of the top of the rear wall in a hook carrying edge extending parallel with the rear wall and spaced forwardly therefrom, and a closure pivotally mounted at the top edge of said partial front wall comprising a main portion forming the balance of the front wall of the container and a laterally projecting flange forming the top end wall of the container when the closure is in closed position, and means on the inner side of said flange cooperating with the top edge of said bracket member when the closure is in closed position to retain hooks on the top edge of said bracket.

8. A container for fish hooks or the like comprising an elongated main casing portion having a rear wall, a partial front wall and a bottom wall, said main casing portion providing at the end opposite said bottom wall an opening extending longitudinally of the casing, a fish hook supporting member having a hook supporting edge disposed in said opening and extending longitudinally of the main casing portion in spaced relation to and parallel with said front and rear walls, and a closure pivoted to said front wall for closing the opening of said main casing and operable when in closed position to complete the container and to cooperate with the hook supporting edge of said supporting member to engage and hold fish hooks thereon in position.

LOUIS W. VOGEL.

REFERENCES CITED

The following references are of record in the file of this patent:

UNITED STATES PATENTS

| Number | Name | Date |
|---|---|---|
| 115,175 | Davis | May 23, 1871 |
| 952,314 | Ellsworth | Mar. 15, 1910 |
| 1,397,790 | Tegner | Nov. 22, 1921 |
| 1,749,229 | Pruet | Mar. 4, 1930 |
| 2,064,120 | Jacobus | Dec. 15, 1936 |
| 2,220,817 | Holmes | Nov. 5, 1940 |
| 2,242,509 | Coalson | May 20, 1941 |

FOREIGN PATENTS

| Number | Country | Date |
|---|---|---|
| 12,490 | Great Britain | 1894 |